United States Patent [19]

Lewis

[11] Patent Number: 4,764,487
[45] Date of Patent: Aug. 16, 1988

[54] HIGH IRON GLASS COMPOSITION

[75] Inventor: Albert Lewis, Covina, Calif.

[73] Assignee: Glass Incorporated International, Chino, Calif.

[21] Appl. No.: 762,411

[22] Filed: Aug. 5, 1985

[51] Int. Cl.$^4$ .............................................. C03C 3/087
[52] U.S. Cl. ........................................ 501/70; 501/35; 501/38; 501/69
[58] Field of Search ................ 501/71, 35, 38, 69, 501/70

[56] References Cited

U.S. PATENT DOCUMENTS

| | | | |
|---|---|---|---|
| 2,582,852 | 1/1952 | Shoemaker | 501/70 |
| 3,929,497 | 12/1975 | Monks | 501/70 |
| 4,009,015 | 2/1977 | McCollister | 501/70 |
| 4,199,336 | 4/1980 | Rittler | 501/70 |
| 4,396,722 | 8/1983 | Rapp | 501/70 |
| 4,461,840 | 7/1984 | Massol et al. | 501/70 |

FOREIGN PATENT DOCUMENTS

| | | | |
|---|---|---|---|
| 504715 | 2/1976 | U.S.S.R. | 501/70 |
| 528271 | 9/1976 | U.S.S.R. | 501/70 |
| 653231 | 3/1979 | U.S.S.R. | 501/70 |
| 895945 | 1/1981 | U.S.S.R. | 501/70 |
| 823325 | 4/1981 | U.S.S.R. | 501/70 |

*Primary Examiner*—Stephen J. Lechert, Jr.
*Attorney, Agent, or Firm*—Boniard I. Brown

[57] ABSTRACT

An improved glass composition, especially suitable for glass fiber manufacture having good fiberizing characteristics and good physical properties, and containing typically 40.0% to 65.0% silica, 4.0% to 11.0% aluminum oxide, 6.0% to 20.0% sodium oxide, 5.0% to 8.0% magnesium oxide and 6.0% to 17.0% calcium oxide, 4.0% to 12.0% ferric and ferrous oxide, and 0.0% to 7.0% potassium oxide.

3 Claims, No Drawings

HIGH IRON GLASS COMPOSITION

BACKGROUND OF THE INVENTION

This invention relates to glass compositions and particularly to glass compositions and fibers having good fiberizing characteristics, high strength, high modulus of elasticity and high durability at high temperatures.

There has been a demand for fiber glass compositions which can be successfully formed into fibers, particularly for use in insulation and acoustical products, and as reinforcements for other materials were high strength, high modulus of elasticity and high temperature resistance are important. The problems of achieving these characteristics at low cost have long been recognized in the glass art; however, no completely satisfactory composition has been available for forming long glass fibers having the desired characteristics. High temperature glass compositions have heretofore been produced, but they are subject to the drawbacks of having a short working temperature range or being too expensive to produce due to the high costs of the raw material or energy requirements.

An object of this invention is to provide a glass which will possess the properties lacking in the glass of the prior art. Thus, one object of this invention is to provide a glass which has good insulation and acoustical properties, high strength and a high modulus of elasticity.

Another object is to provide a glass which has high strength that can be drawn into long, stable glass fibers.

A further object is to provide a method for producing this glass.

The present invention provides glass which is capable of being formed into fibers for insulation and acoustical products using the centrifugal rotary process, or can be drawn continuously into fiber for roving or parallel mat, and which is characterized as having high strength and high durability at high temperature. One fiber forming system is set forth in U.S. Pat. No. 3,219,425. The material of this invention differs from other high temperature resistant glasses in that, unlike those used heretofore, the material of this invention has good resistance to devitrification and requires lower processing energy. The present glass has improved insulation and strength characteristics. It is relatively easy to melt and requires very little refining to free it from impurities, allowing continuous or discontinuous fibers to be produced with relative ease.

The glass of the present invention may be used in any area where high strength is required. This includes its use in a resinous matrix as a reinforcement for inorganic as well as organic matrices, and as a reinforcement for asphaltic products.

The compositions of the present invention provide for a reduction in cost of approximately 20% due to the use of less expensive raw materials and lower energy usage to process it into glass. In addition, it has been found that less binder is required than in known, commercially available compositions due to the improved surface and high strength of the fiber.

The compositions of the present invention have the following compositions by weight:
 about 40.0% to about 65.0% silica,
 about 6.0% to 11.0% aluminum oxide,
 about 6.0% to 20.0% sodium oxide,
 about 5.0% to about 8.0% magnesium oxide,
 about 6.0% to about 17.0% calcium oxide,
 about 4.0% to about 12.0% ferrous and ferric oxide,
 up to about 0.0% to 7.0% potassium oxide.

Trace impurities are also present in the glass but occur in such small quantities that they do not affect the composition.

The glasses of the present invention are prepared by continuous melting of the batch raw material within the following approximate ranges at temperatures of between about 2600 degrees F. to about 2900 degrees F. in conventional refractory containers. The batch composition ranges are based upon the following materials giving the proportions by weight percent of the components:
 Basalt: 55-95
 Sand: 5-22
 Soda Ash: 5-22
 Limestone: 5-10
 Potash: 0-9
 Zirconia: 0-10

The glass compositions of this invention have a liquidus temperature below 1200 degrees C. and a log. viscosity of (2.5) at approximately 1150 degrees C. These glasses are therefore suitable for glass forming. The glasses of this invention, with a large amount of iron oxide, seem to have improved chemical durability. The batch can be melted in a state-of-the-art fossil fuel or electric furnace.

The batch components are weighed in a dry powder or granular form and mixed in a conventional or pneumatic mixer. The dry batch may then be dampened with water to prevent loss from dusting while the batch is being transferred to the furnace, or it may be used dry. The batch is then charged into the furnace which has already been brought to the desired melt temperature. No mechanical stirring of the batch in the furnace is necessary since the natural convection currents, which are formed during the melting process, act to provide circulation. In addition, pneumatic mixing may be used. Samples of glass are taken from the furnace at periodic intervals to determine when the glass has reached uniform composition. This is generally after the sand, which is last to melt completely, has dissolved.

The glass may then flow directly to a bushing for fiber production if a direct melt process is sued or the glass may be cooled to a frit or pellet form and then remelted in a fiber bushing if a pellet feeding process is utilized (Flame Attenuation).

The molten glass can be formed into insulation and acoustical fibers using the centrifugal rotary process or the flame attenuation process. In case of the flame attenuation process, the fibers are formed from previously made pellets. The pellets are remelted in a small, remelt furnace. By gravity the glass flows through small holes (100-200) in the bottom of the furnace. The fibers are reduced in diameter by mechanically pulling them in sets of pull rolls. A further and final attenuation is achieved by blowing the fiber by a hot, gaseous blast as they emerge from the pull-rolls. The fibers are gathered into a mat on a chain conveyor. Fiber diameter in the range of approximately 4 microns is achieved with the process.

In case of the centrifugal rotary process similar to the process described in U.S. Pat. Nos. 3,190,736 and 3,219,425, the glass flows from the melter directly into the forehearth of the furnace and then into a single hole bushing. From the orifice of the bushing the glass flows in a continuous stream into a high speed, rotating disc. Due to the high centrifugal speed, sufficient force is created to force the glass through small holes (approximately 10,000) in the side of the disc. As the glass passes through the holes in the form of a small stream, it i further attenuated into smaller diameter fibers using a cold and/or hot gaseous blast. The resultant fibers are collected on a chain conveyor as a mat which conveys it though the balance of the manufacturing process. Fiber diameters in the range of approximately 5 to 6 microns are normally made using this process. Both of the above processes may be used to manufacture sub-micron fibers.

The molten glass can also be drawn into fibers on a conventional drawing wheel at speeds up to 12,000 feet per minute and temperatures of between about 1204 degrees to about 1260 degrees C. Speeds of between about 5000 to about 10,000 feet per minute are preferred in order to give optimum filament properties.

The fibers may be drawn from about 0.0001 to about 0.004 inch in diameter, although diameters of between about 0.00035 and 0.0004 inch are preferred.

To further illustrate the invention, the following examples are presented. The raw materials are given in pounds and the glasses in oxides by weight percent:

The following typical batches were mixed in a dry granular form as discussed above and melted in a conventional refractory furnace at a temperature between 1425 degrees F. and 1600 degrees F. The resultant glasses were successfully fiberized into continuous and glass wool fibers:

TYPICAL BATCH BLENDS

| | | | | | | | | | | | | | | | | |
|---|---|---|---|---|---|---|---|---|---|---|---|---|---|---|---|---|
| Basalt | 90 | 90 | 90 | 90 | 95 | 90 | | 90 | 90 | 70 | 70 | 65 | 60 | 60 | 59.0 | 55.0 |
| Soda Ash | | 5 | 10 | | | | | | | 10 | 18 | 9 | 9 | 18 | 15.0 | 20.5 |
| Limestone | | | | 5 | 5 | 10 | | | | | | | | | 3.5 | |
| Sand | 5 | 5 | | 10 | | 5 | | | | 12 | 26 | 31 | 22 | 22.0 | 23.0 | |
| Potassium Carbonate | | | | | | | | | | | | | | | | 7.0 |
| Boric Acid | 5 | | | | | | | | | | | | | | | |
| Glass Cullet | | | | | | | | 10 | 20 | | | | | | | |

NOTE:
Fly-ash, perlite, zeolite or slag may be substituted for basalt.

TYPICAL GLASS COMPOSITION

| OXIDES | WEIGHT PERCENTS |
|---|---|
| $SiO_2$ | 40.0–65.0 |
| $Al_2O_3$ | 6.0–10.0 |
| $TiO_2$ | 1.0–3.0 |
| $Fe_2O_3/FeO$ | 4.0–9.0 |
| $Na_2O$ | 6.0–20.0 |
| $K_2O$ | 0.0–7.0 |
| CaO | 6.0–10.0 |
| MgO | 5.0–8.0 |

The glass batch used to prepare these compositions contains large amounts of iron oxide. The main raw materials that may be used in these glass batches are slags, fly-ash, perlite, zeolites or basalt.

Other glass compositions which may be formed into fibers with good results are listed in the following examples.

EXAMPLE 1

| OXIDES | WEIGHT PERCENT |
|---|---|
| $SiO_2$ | 44.6 |
| $Al_2O_3$ | 9.7 |
| $Na_2O$ | 12.4 |
| $K_2O$ | 0.8 |
| CaO | 16.3 |
| MgO | 6.8 |
| FeO & $Fe_2O_3$ | 7.8 |
| $TiO_2$ | 1.9 |

EXAMPLE 2

| OXIDES | WEIGHT PERCENT |
|---|---|
| $SiO_2$ | 47.9 |
| $Al_2O_3$ | 10.9 |
| $Na_2O$ | 13.9 |
| $K_2O$ | 0.8 |
| CaO | 8.2 |
| MgO | 7.6 |
| FeO & $Fe_2O_3$ | 8.7 |
| $TiO_2$ | 1.9 |

EXAMPLE 3

| OXIDES | WEIGHT PERCENT |
|---|---|
| $SiO_2$ | 53.8 |
| $Al_2O_3$ | 9.3 |
| $Na_2O$ | 13.6 |
| $K_2O$ | 0.7 |
| CaO | 6.9 |
| MgO | 6.5 |
| FeO & $Fe_2O_3$ | 7.4 |
| $TiO_2$ | 1.7 |

EXAMPLE 4

| OXIDES | WEIGHT PERCENT |
|---|---|
| $SiO_2$ | 55.4 |
| $Al_2O_3$ | 9.2 |
| $Na_2O$ | 11.7 |
| $K_2O$ | 0.7 |
| CaO | 9.0 |
| MgO | 6.4 |
| FeO & $Fe_2O_3$ | 7.3 |
| $TiO_2$ | 1.7 |

EXAMPLE 5

| OXIDES | WEIGHT PERCENT |
|---|---|
| $SiO_2$ | 58.4 |
| $Al_2O_3$ | 9.7 |
| $Na_2O$ | 7.7 |
| $K_2O$ | 0.7 |
| CaO | 7.3 |
| MgO | 6.7 |
| FeO & $Fe_2O_3$ | 7.8 |
| $TiO_2$ | 1.8 |

What is claimed is:

1. A batch blend to produce a glass composition useful for forming glass fibers comprising:
   basalt in an amount ranging from about 55 to about 95 weight percent;
   sand in an amount ranging from about 5 to about 22 weight percent;
   soda ash in an amount ranging from about 5 to about 22 weight percent;
   limestone in an amount ranging from about 5 to about 10 percent;
   pot ash in an amount less than about 9 weight percent; and
   zirconia in an amount less than about 10 weight percent.

2. The batch blend of claim 1 wherein the resulting composition is essentially free of boron.

3. A batch blend to produce a glass composition useful for forming glass fibers comprising:
   basalt in an amount ranging from about 70 to about 95 weight percent;
   sand in an amount ranging from about 5 to about 22 weight percent;
   soda ash in an amount ranging from about 5 to about 22 weight percent;
   limestone in an amount ranging from about 5 to about 10 percent;
   pot ash in an amount less than about 9 weight percent; and
   zirconia in an amount less than about 10 weight percent.

* * * * *